3,247,142
HOT MELT COMPOSITIONS COMPRISING POLY-
ETHYLENE, HYDROCARBON RESIN AND ACET-
YLATED MONOGLYCERIDE
Marion O. Brunson and William M. Gearhart, Kingsport,
Tenn., assignors to Eastman Kodak Company, Roches-
ter, N.Y., a corporation of New Jersey
No Drawing. Filed Dec. 22, 1961, Ser. No. 161,442
7 Claims. (Cl. 260—23)

This invention relates to a hot melt polyethylene coating composition characterized by excellent heat sealing properties and at normal temperatures by a surface in substantially tack-free condition.

Hot melt polyethylene is a normally solid polyethylene which melts or liquefies upon heating and solidifies upon cooling. Typical examples of hot melt polyethylene are the low molecular weight polymers of ethylene.

Hot melt polyethylene has properties that are particularly desired in both plain and decorative coatings for paper, paperboard and the like products. These properties are, for example: moisture resistance, crease resistance, toughness, flexibility, solid at normal temperature, liquid at practical high temperatures, chemical inertness, ease of application to the web or sheet, and the like.

On the other hand, hot melt polyethylene is deficient in certain adhesive properties such as fiber tearing, heat seal bonding. Consequently, in order to adapt hot melt polyethylene to heat sealing coating use and to heat seal adhesive use, there is incorporated into the polyethylene a suitable material which gives to the resulting polyethylene composition the desired heat sealing properties. Representative of such a material are certain synthetic hydrocarbon resins produced as by the polymerization of unsaturated compounds obtained from the deep cracking of petroleum and certain synthetic, polyterpene type, hydrocarbon resins produced as by the polymerization of unsaturated compounds obtained from wood distillation. Such a material, whether a single chemical compound or a mixture of chemical compounds, is hereinafter referred to as a high temperature adhesive. In general, the concentration of the high temperature adhesive in polyethylene coating and heat seal adhesive compositions is in a range from about 5 to about 50% by weight of the coating composition.

Polyethylene coating compositions containing a high temperature adhesive have a disadvantage, however, in that at temperatures lower than heat sealing temperature, that is, at normal temperatures, coatings prepared from these compositions have enough surface tack as to result in blocking of the coated sheet and in difficulty in handling of the coated sheet on packaging and fabricating machinery. Blocking, as is well known, is a condition characterized by a tendency to stick together or by resistance to separation when separating forces are applied perpendicularly as by simple lifting action to at least one of two adjacent sheets.

The problem to which this invention is directed is to provide polyethylene coating compositions containing a high temperature adhesive, which composition has the desired heat sealing properties and yet has at normal temperatures no significant surface tack.

A general object of this invention is to provide a solution to this problem.

A specific object of this invention is to provide an additive for a normally surface tacky hot melt polyethylene coating composition consisting essentially of a hot melt polyethylene component and a high temperature adhesive, which additive substantially reduces the surface tack of the coating at normal temperatures without adversely affecting the heat sealing properties of the coating.

These and other objects are achieved by this invention which is based on our discovery that an acetylated monoglyceride upon incorporation in effective quantity into a hot melt polyethylene composition which otherwise at normal temperature has significant surface tack, eliminates the surface tack without adversely affecting the heat seal properties of the composition.

In summary, this invention involves a hot melt polyethylene composition consisting essentially of a hot melt polyethylene polymeric component, a high temperature adhesive and an acetylated monoglyceride product.

The hot melt polyethylene polymeric component consists essentially of a hot melt polyethylene. Generally, the hot melt polyethylene is a normally solid, low molecular weight polymer of ethylene. Polyethylene resins having a number average molecular weight ($\overline{M}_n$) in a range from about 1500 to about 10,000, a Brookfield visviscosity at 300° F. less than about 15,000 centipoises and a density generally in a range from about 0.890 to about 0.950 and preferably in a range from about 0.900 to about 0.925 are particularly suitable. Polyethylene resins having these properties are well known and are commercially available. Moreover, processes for making them are well known and in use, wherefore, there is no need to describe them here. In addition to hot melt polyethylene the polymeric component can also comprise other polymers that are compatible with the hot melt polyethylene and which do not adversely affect desired properties of the hot melt polyethylene. In such event the polyethylene content of the polymeric component is at least about 50% by weight.

Concentration of the hot melt polyethylene polymeric component is generally in a range from about 50 to about 95% by weight of the combination of the polymeric component and high temperature adhesive.

The high temperature adhesive is any material that is compatible with the hot melt polyethylene polymeric component and that increases the surface tack of the composition when the composition is heated. While a number of materials meet these qualifications, the preferred ones are those previously mentioned herein. In this regard, for use in the composition of this invention, the synthetic hydrocarbon resin produced as by the polymerization of unsaturated compounds obtained from the deep cracking of petroleum, preferably should have a softening point in a range from about 50 to about 150° C., a specific gravity (25/25° C., which means ratio of weight of resin at 25° C. to weight of an equal volume of water at 25° C.) in a range from about 0.970 to about 0.980, an acid number less than 1, an iodine number (Wijs) in a range from about 80 to about 150 and a Staudinger molecular weight in a range from about 500 to about 1500. In the case of a synthetic, terpene type hydrocarbon resin produced as by the polymerization of unsaturated compounds obtained from wood distillation, the preferred properties are a softening point from about 40 to about 150° C., a specific gravity (25/25° C.) in a range from about 0.970 to about 0.980, an acid number less than 1 and a Staudinger molecular weight in a range from about 300 to about 1500.

Concentration of the high temperature adhesive is generally in a range from about 5 to about 50% by weight of the combination of the polymeric component and high temperature adhesive.

The acetylated monoglyceride product consists essentially of a glyceryl monoester of a higher fatty acid, which has been acetylated. In addition to the higher fatty acid moiety the glyceride molecule has at least one acetic acid moiety and in the case of fully acetylated monoglycerides two acetic acid moieties. The higher fatty acid moiety generally has from about 8 to about 22 carbon atoms. A higher number of carbon atoms in the higher fatty acid moiety is possible. However, because fatty acids of more than about 22 carbon atoms are not commercially available in large quantities, 22 carbon atoms represents a practical upper limit on the carbon atom content of the higher fatty acid moiety. A carbon atom content of the higher fatty acid moiety less than about 8 carbon atoms does not give satisfactory results. In general, acetylated monoglyceride products are prepared commercially by interesterifying vegetable and animal fats (including those which have been previously wholly or partially hydrogenated) with triacetin (in some cases with added glycerol) using soap catalysts at a concentration of about 1–2% by weight. Typical interesterification reaction conditions are 0.5–1.5 hours and 230–260° C. The resulting reaction product is stripped in a molecular still (about 120° C. at about 100 microns of mercury pressure) to remove acetylated glycerol, and then distilled (about 185° C. at about 10 microns pressure) to remove catalysts, acetylated diglycerides and triglycerides. The resulting distilled, acetylated monoglyceride product usually is a mixture of acetylated monoglycerides of the various fatty acid moieties present in the fat from which the product is obtained. The concentration of the acetylated monoglycerides is at least 50% by weight of the product and usually 80% by weight of the product. Commercially available, acetylated monoglyceride products range from normally liquid to normally solid depending on the extent of acetylation as well as the chemical saturation of the fat from which the monoglyceride is derived. These commercially available acetylated monoglyceride products in either the normally liquid or normally solid states are effective in the specific embodiments of the composition of this invention to overcome surface tack at normal temperatures of the blend of the hot melt polyethylene polymeric component and the high temperature adhesive without adversely affecting the heat sealing properties of the blend.

Concentration of the acetylated monoglyceride product in the hot melt composition of this invention is in a general range from about 0.5 to 5% of the combined weight of the hot melt polyethylene polymeric component and the high temperature adhesive. Most satisfactory results, however, are obtained when the acetylated monoglyceride component concentration is in a range from about 0.5 to about 1.5% of the combined weight of the hot melt polyethylene polymeric component and the high temperature adhesive. At concentrations below about 0.5% by weight, the surface tack of the blend of the hot melt polyethylene polymeric component and high temperature adhesive is not significantly reduced. At concentrations above about 1.5% by weight, there results a noticeable decrease in the heat sealability of the hot melt composition, the decrease becoming substantial and objectionable at a concentration above 5% by weight.

The hot melt polyethylene coating composition of this invention is prepared by melting and blending at a temperature of 300–400° F. the hot melt polyethylene polymeric component, the high temperature adhesive and the acetylated monoglyceride product in a container of suitable size.

To use the hot melt polyethylene coating compositions of this invention, heat the same to a molten state, apply the melt as by conventional ways and means to the desired thickness on a web or sheet such as paper, paperboard, aluminum foil, and the like, and then cool the resulting coating to the point of solidification.

This invention is illustrated by the following examples of various aspects thereof including specific embodiments. Unless otherwise indicated, this invention is not limited to these specific embodiments.

*Example 1*

This example illustrates a specific embodiment of the hot melt polyethylene coating composition of this invention, its preparation, the coating of a sheet with it, and typical, comparative results.

The components of this embodiment and quantities employed are:

90 parts by weight of a polyethylene having a molecular weight ($\overline{M}_n$) of about 6600, a density of 0.902 and a Brookfield viscosity at 300° F. less than about 15,000 centipoises (about 14,000 centipoises at 257° F.) (Epolene C–10 polyethylene).

10 parts by weight of a high temperature adhesive, specifically a synthetic, polyterpene type hydrocarbon resin produced by the polymerization of unsaturated compounds obtained from wood distillation, said resin having a softening point of 115° C., a specific gravity (25/25° C.) of 0.980, a flash point of 450° F., an acid number less than 1 and a molecular weight of 1200 (Piccolyte S 115–L) and 1 part by weight of an acetylated monoglyceride product derived from hydrogenated lard, corresponding to a distilled monoglyceride product in which approximately two-thirds of the free hydroxy groups have been acetylated, and having an acetylated monoglyceride content of about 93% by weight of the product (Myvacet distilled acetylated monoglycerides, type 7–00).

A hot melt polyethylene coating composition consisting essentially of these components is prepared by merely melting and admixing the components until a uniform blend is obtained.

To use this coating composition, apply it by roll coating at 350° F. to a web or sheet and then let the resulting coating solidify. For instance, apply it by roll coating at 350° F. to a 40 pound/ream, machined, glazed, bleached kraft paper.

Typically, the resulting coated sheet exhibits excellent gloss, adhesion and heat seal, and good slip. Moreover, the coating on the sheet typically has no significant surface tack. On the other hand, a coating composition of the same hot melt polyethylene and high temperature adhesive components but without an acetylated monoglyceride product present therein results, when applied, for example, by roll coating at 350° F. to a 40 pound per ream, machined, glazed, bleached kraft paper, in a coating with a surface so tacky that the sheet blocks in the rewind roll. No such blocking occurs with the sheet coated with the coating composition of this invention.

*Example 2*

This example illustrates another specific embodiment of the hot melt polyethylene coating composition of this invention, its preparation, the coating of a sheet with it and typical, comparative results.

The components of this embodiment and quantities employed are:

70 parts by weight of the polyethylene of Example 1, 30 parts by weight of a high temperature adhesive, specifically a synthetic, polyolefin type hydrocarbon resin produced from the deep cracking of petroleum, said resin having a softening point of 100° C., a specific gravity (25/25° C.) of 0.96–0.98, an acid number less than 1, an iodine number (Wijs) of 195 and a molecular weight of 1400 (Piccopale 100), and 1 part by weight of an acetylated monoglyceride product derived from hydrogenated lard corresponding to a distilled monoglyceride product in which approximately one-half of the free hydroxyl groups have been acetylated and having an acetylated monoglycerides content of about 86% by weight of the product (Myvacet distilled acetylated monoglycerides, type 5–00).

To prepare a hot melt polyethylene coating composition from these components, melt and admix these components until a uniform blend is obtained.

To use this coating composition, apply it by roll coating at 350° F. to a web or sheet and then allow the resulting coating to solidify.

Typical results are a coated web or sheet with excellent heat-seal properties, good MVT resistance, high gloss, good slip and substantially no surface tack. A coated web or sheet prepared from the same hot melt polyethylene and high temperature adhesive components but without an acetylated monoglyceride product results, when applied, for example, by roll coating at 300° F., to a 40 pound per ream, machined, finished, natural kraft paper, in a coating with a surface so tacky that the sheet blocks in the rewind roll. No such blocking occurs with the sheet coated with the coating composition of this invention.

Thus, this invention provides a hot melt polyethylene coating composition having good heat seal properties and yet a surface substantially tack-free at normal temperatures.

A feature of advantage of the coating composition of this invention is that it provides a surface which not only has reduced surface tack but also reduced friction. Consequently, the coating composition of this invention has good slip properties. This enables webs or sheets coated with this composition to pass over packaging equipment without binding. This property is attributed to the acetylated monoglyceride product in the coating composition. Hence, this invention, considered in its broadest aspects, involves a polyethylene composition containing as a slip agent an acetylated monoglyceride product and, more specifically, a polyethylene composition consisting essentially of a polyethylene polymeric component (which can include a high temperature adhesive) and an acetylated monoglyceride product, preferably at a concentration in a range from about 0.5 to about 5% by weight of the polymeric component.

Other features, benefits and advantages of this invention will be readily apparent to those in the exercise of ordinary skill in the art after reading the foregoing disclosure. In this regard, while this invention has been described in detail relative to certain specific embodiments thereof, variations and modifications of these embodiments can be effected within the spirit and scope of this invention as defined by the claims.

The embodiments of the invention in which an exclusive property or privilege is claimed are defined as follows:

1. A hot melt polyethylene coating composition consisting essentially of a hot melt polyethylene polymeric component at a concentration in a range from about 50 to about 95 parts by weight, a high temperature adhesive at a concentration in a range from about 5 to about 50 parts by weight and an acetylated monoglyceride product at a concentration effective to substantially reduce at normal temperatures the surface tack of said polymeric component and said high temperature adhesive.

2. A hot melt polyethylene coating composition consisting essentially of a holt melt polyethylene polymeric component at a concentration in a range from about 50 to about 95 parts by weight, a high temperature adhesive at a concentration in a range from about 5 to 50 parts by weight, and an acetylated monoglyceride product at a concentration in a range from about 0.5 to about 5% by weight of the combined weight of said polymeric component and said high temperature adhesive.

3. A hot melt polyethylene coating composition consisting essentially of (1) a hot melt polyethylene polymeric component at a concentration in a range from about 50 to about 95 parts by weight with at least about 50% by weight thereof being polyethylene, (2) a high temperature adhesive at a concentration in a range from about 5 to about 50 parts by weight, and (3) an acetylated monoglyceride product at a concentration in a range from about 0.5 to about 5% by weight of the combined weight of said polymeric component and said high temperature adhesive.

4. A hot melt polyethylene coating composition consisting essentially of (1) a normally solid polymer of ethylene having a number average molecular weight in a range from about 1500 to about 10,000, a Brookfield viscosity at 300° F. less than about 15,000 centipoises and a density in the range from about 0.890 to about 0.950, the concentration of said polymer being in a range from about 50 to about 95 parts by weight, (2) a synthetic hydrocarbon resin produced as by the polymerization of unsaturated compounds obtained from the deep cracking of petroleum and having a softening point in a range from about 50 to about 150° C., a specific gravity (25/25° C.) in a range from about 0.970 to about 0.980, an acid number less than 1, an iodine number (Wijs) in a range from about 80 to about 150 and a molecular weight in a range from about 500 to about 1500, the concentration of said resin being in a range from about 5 to about 50 parts by weight, and (3) an acetylated monoglyceride product having an acetylated monoglyceride content of at least about 80% by weight of the product, the concentration of said product being in a range from about 0.5 to about 1.5% by weight of the combined weight of said polymer of ethylene and said hydrocarbon resin.

5. A hot melt polyethylene coating composition consisting essentially of (1) a normally solid polymer of ethylene having a number average molecular weight in a range from about 1500 to about 10,000, a Brookfield viscosity at 300° F. less than about 15,000 centipoises and a density in the range from about 0.890 to about 0.950, the concentration of said polymer being in a range from about 50 to about 95 parts by weight, (2) a synthetic hydrocarbon resin produced as by the polymerization of unsaturated compounds obtained from the deep cracking of petroleum and having a softening point in a range from about 50 to about 150° C., a specific gravity (25/25° C.) in a range from about 0.970 to about 0.980, an acid number less than 1, an iodine number (Wijs) in a range from about 80 to about 150 and a molecular weight in a range from about 500 to about 1500, the concentration of said resin being in a range from about 5 to about 50 parts by weight, and (3) an acetylated monoglyceride product having an acetylated monoglyceride content of at least about 80% by weight of the product, said product being derived from hydrogenated lard and corresponding to a distilled monoglyceride product in which approximately one-half of the free hydroxyl groups have been acetylated, the concentration of said product being in a range from about 0.5 to about 1.5% by weight of the combined weight of said polymer of ethylene and said hydrocarbon resin.

6. A hot melt polyethylene coating composition consisting essentially of (1) a normally solid polymer of ethylene having a number average molecular weight in a range from about 1500 to about 10,000, a Brookfield viscosity at 300° F. less than about 15,000 centipoises and a density in the range from about 0.890 to about 0.950, the concentration of said polymer being in a range from about 50 to about 95 parts by weight, (2) a synthetic, polyterpene type hydrocarbon resin produced by the polymerization of unsaturated compounds obtained from wood distillation and having a softening point in a range from about 0 to about 150° C., a specific gravity (25/25° C.) in a range from about 0.970 to about 0.980, an acid number less than 1 and a molecular weight in a range from about 300 to about 1500, the concentration of said resin being in a range from about 5 to about 50 parts by weight, and (3) an acetylated monoglyceride product having an acetylated monoglyceride content of at least about 80% by weight of the product, the concentration of said product being in a range from about 0.5 to about 1.5% by weight of the combined weight of said polymer of ethylene and said hydrocarbon resin.

7. A hot melt polyethylene coating composition consisting essentially of (1) a normally solid polymer of ethylene having a number average molecular weight in a range from about 1500 to about 10,000, a Brookfield viscosity at 300° F. less than about 15,000 centipoises and a density in the range from about 0.890 to about 0.950, the concentration of said polymer being in a range from about 50 to about 95 parts by weight, (2) a synthetic, polyterpene type hydrocarbon resin produced by the polymerization of unsaturated compounds obtained from wood distillation and having a softening point in a range from about 40 to about 150° C., a specific gravity (25/25° C.) in a range from about 0.970 to about 0.980, an acid number less than 1 and a molecular weight in a range from about 300 to about 1500, the concentration of said resin being in a range from about 5 to about 50 parts by weight, and (3) an acetylated monoglyceride product having an acetylated monoglyceride content of at least about 80% by weight of the product, said product being derived from hydrogenated lard and corresponding to a distilled monoglyceride product in which approximately two-thirds of the free hydroxy groups have been acetylated, the concentration of said product being in a range from about 0.5 to about 1.5% by weight of the combined weight of said polymer of ethylene and said hydrocarbon resin.

References Cited by the Examiner

UNITED STATES PATENTS

| | | | |
|---|---|---|---|
| 1,558,299 | 10/1925 | Schwartz | 260—410.8 |
| 2,453,644 | 11/1948 | Steinkraus | 260—897 |
| 2,484,060 | 10/1949 | Wing | 260—4 |
| 2,527,793 | 10/1950 | Bump et al. | 260—23 |
| 2,569,540 | 10/1951 | Selby | 260—27 |
| 2,615,159 | 10/1952 | Jackson | 260—410.8 |
| 2,808,421 | 10/1957 | Brokaw | 260—410.8 |
| 2,860,115 | 11/1958 | Hecker et al. | 260—23 |
| 2,898,348 | 8/1959 | Swern | 260—23 X |
| 3,015,638 | 1/1962 | Sergi | 260—27 |
| 3,148,059 | 9/1964 | Brunson et al. | 260—23 |

DONALD E. CZAJA, *Primary Examiner.*

MILTON STERMAN, LEON J. BERCOVITZ,
*Examiners.*